United States Patent
Murthy et al.

(10) Patent No.: US 9,781,624 B2
(45) Date of Patent: Oct. 3, 2017

(54) SYSTEM AND METHOD FOR INTUITIVE PACKET BUFFERING AND ADAPTIVE PAGING

(71) Applicant: Mavenir Systems, Inc., Richardson, TX (US)

(72) Inventors: Veena Murthy, Allen, TX (US); Ravi Danda, Irving, TX (US)

(73) Assignee: MAVENIR SYSTEMS, INC., Richardson, TX (US)

( * ) Notice: Subject to any disclaimer, the term of this patent is extended or adjusted under 35 U.S.C. 154(b) by 406 days.

(21) Appl. No.: 14/529,901

(22) Filed: Oct. 31, 2014

(65) Prior Publication Data
US 2016/0128078 A1 May 5, 2016

(51) Int. Cl.
| | |
|---|---|
| *H04J 3/14* | (2006.01) |
| *H04W 28/02* | (2009.01) |
| *H04W 24/02* | (2009.01) |

(52) U.S. Cl.
CPC ... *H04W 28/0205* (2013.01); *H04W 28/0268* (2013.01); *H04W 24/02* (2013.01)

(58) Field of Classification Search
CPC ............. H04W 24/02; H04W 28/0268; H04W 52/0251; H04W 52/258
See application file for complete search history.

(56) References Cited

U.S. PATENT DOCUMENTS

| | | | |
|---|---|---|---|
| 2011/0286465 A1 | 11/2011 | Koodli et al. | |
| 2011/0320617 A1* | 12/2011 | Annamalaisami | H04L 63/1458 709/228 |
| 2012/0281561 A1* | 11/2012 | Shukla | H04W 76/068 370/252 |

(Continued)

FOREIGN PATENT DOCUMENTS

SE WO2011026663 A2 3/2011

OTHER PUBLICATIONS

LTE and Beyond, LTE attach procedure / LTE and Beyond / Tech-blog on 4G/LTE and beyond, http://www.lteandbeyond.com/2012/01/lte-attach-procedure.html, pp. 1-8, (Jan. 28, 2012).

(Continued)

*Primary Examiner* — Charles C Jiang
*Assistant Examiner* — Ryan Kavleski
(74) *Attorney, Agent, or Firm* — Ohlandt, Greeley, Ruggiero & Perle, L.L.P.

(57) ABSTRACT

The solution introduces a flexible mechanism to avoid paging a delay-tolerant UE prematurely by buffering its high frequency, low priority data for a time duration set according to the UE's current and historic activity data, thereby increasing radio resource and network efficiency, and reducing UE batter drainage. A method of managing frequent low priority downlink data transmissions comprises receiving a downlink data packet intended for a UE, buffering the received downlink data packet in response to a determination that the received downlink data packet is low priority, and the UE is delay-tolerant, starting a timer, the timer being set in response in response to the UE currently being in an idle state, the timer being set according to a next anticipated activity time for the UE, and transmitting the downlink data packet to the UE upon the expiration of the timer.

33 Claims, 5 Drawing Sheets

(56) References Cited

U.S. PATENT DOCUMENTS

| | | | |
|---|---|---|---|
| 2013/0107727 A1* | 5/2013 | Lunden | H04W 52/0251 370/252 |
| 2013/0128744 A1 | 5/2013 | Landais et al. | |
| 2014/0092733 A1* | 4/2014 | Johansson | H04W 52/0216 370/230 |
| 2014/0092799 A1* | 4/2014 | Jain | H04W 52/0258 370/311 |
| 2014/0105028 A1 | 4/2014 | Bhaskaran et al. | |
| 2014/0155109 A1 | 6/2014 | Vaidya et al. | |
| 2014/0169299 A1 | 6/2014 | Wang et al. | |
| 2015/0271176 A1* | 9/2015 | Wei | H04W 52/0209 455/411 |

OTHER PUBLICATIONS

3GPP LTE; General Packet Radio Service (GPRS) enhancements for Evolved Universal Terrestrial Radio Access Network (E-UTRAN) access (3GPP TS 23.401 version 11.3.0 Release 11), https://archive.org/details/etsi_ts_123_401_v11.03.00 (Nov. 2012).

* cited by examiner

SYSTEM AND METHOD FOR INTUITIVE PACKET BUFFERING AND ADAPTIVE PAGING

FIELD

The present disclosure relates to a telecommunications system, and more particularly to a system and method for intuitive packet buffering and adaptive paging.

BACKGROUND

The Third Generation Partnership Project (3GPP) unites six telecommunications standards bodies, known as "Organizational Partners," and provides their members with a stable environment to produce the highly successful Reports and Specifications that define 3GPP technologies. A mobile device, also called a User Equipment (UE), may operate in a wireless communication network that provides high-speed data and/or voice communications. The wireless communication networks may implement circuit-switched (CS) and/or packet-switched (PS) communication protocols to provide various services. For example, the UE may operate in accordance with one or more radio technology such as Universal Terrestrial Radio Access (UTRA), Evolved UTRA (E-UTRA), and GSM as part of an Universal Mobile Telecommunication System (UMTS). UTRA, E-UTRA, GSM, UMTS and LTE (Long Term Evolution) are described in specification documents from an organization named "3rd Generation Partnership Project" (3GPP). These various radio technologies and standards are known in the art.

The Evolved Packet Core (EPC) is the latest evolution of the 3GPP core network architecture first introduced in Release 8 of the standard. In EPC, the user data and the signaling data are separated into the user plane and the control plane. The EPC is composed of four basic network elements: the Serving Gateway (SGW), the Packet Data Network Gateway (PDN GW or PGW), the Mobility Management Entity (MME), and the Home Subscriber Server (HSS). The EPC is connected to external networks, which can include the IP Multimedia Core Network Subsystem (IMS).

Incorporated herein by reference is 3GPP specifications ETSI TS 123 401 LTE; General Packet Radio Service (GPRS) Enhancements for Evolved Universal Terrestrial Radio Access Network (E-UTRAN) Access (3GPP TS 23.401).

DETAILED DESCRIPTION

Figure 1:
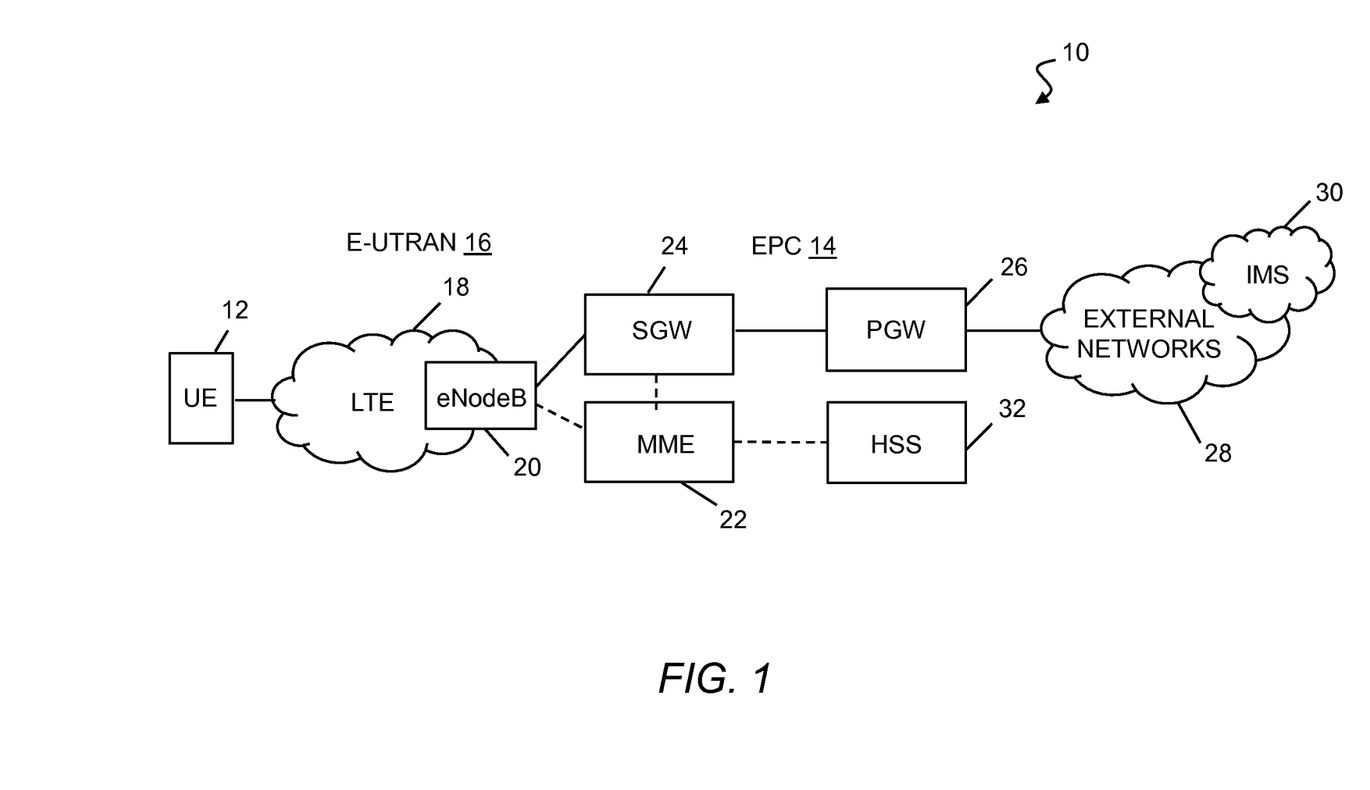
FIG. 1 is a simplified block diagram of an exemplary Evolved Packet System (EPS) network architecture according to the present disclosure.

FIG. 1 is a simplified diagram illustrating an Evolved Packet System (EPS) 10. The EPS 10 may include one or more user equipment (UE) 12 accessing the Evolved Packet Core (EPC) 14 over an Evolved UMTS Terrestrial Radio Access Network (E-UTRAN) 16, an access network in LTE (Long Term Evolution) 18. The E-UTRAN 16 includes at least one evolved Node B (eNodeB) transceiver 20. The eNodeB 20 provides user plane and control plane protocol termination toward the UE 12. The eNodeB 20 may be connected to other eNodeBs via a backhaul (e.g., an X2 interface; not shown).

The eNodeB 20 are also commonly referred to as a base station, a base transceiver station, a radio base station, a radio transceiver, a transceiver function, a basic service set (BSS), and an extended service set (ESS). The eNodeB 20 provides an access point to the EPC 14 for a UE 12. Examples of an UE 12 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, or any other similar functioning device. The UE 12 is a 2G/3G/4G or CDMA-capable device. The UE 12 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNodeB 20 is connected by an 51 interface to the EPC 14. The EPC 14 includes a Mobility Management Entity (MME) 22, other MMEs, a Serving Gateway (SGW) 24, and a Packet Data Network (PDN) Gateway (PGW) 26. The MME 22 is a node in the control plane that processes the signaling related to mobility and security between the UE 12 and the EPC 14. Generally, the MME 22 is configured to manage mobile context, session context, and security information of the UE 12. The MME 22 is further responsible for UE tracking and paging procedures.

The gateway nodes 24 and 26 are in the user plane, and transport IP data traffic between the UE 12 and the external networks 28. All user IP packets are transferred through the SGW 24 and the PGW 26. The SGW 24 is the connection point between the radio-side and the EPC 14, and routes and forwards user IP data packets while also acting as the mobility anchor for the user plane during inter-eNodeB handovers. For UEs in the idle state, the SGW 24 terminates the down link data path and triggers paging when down link data arrives for the UE.

The PGW 26 is the connection point between the EPC 14 and the external networks 28, and provides IP address allocation as well as other functions for the UE 12. The PGW 26 is connected to an operator's external IP networks 28 that may include, for example, the Internet, the Intranet, an IP Multimedia Subsystem (IMS) 30, and a PS Streaming Service (PSS). A UE 12 may have simultaneous connectivity with more than one PGW for accessing multiple Packet Data Networks. The PGW 26 further performs additional functions such as policy enforcement, packet filtering for each user, charging support, lawful interception, and packet screening.

The EPC 14 further includes the Home Subscriber Server (HSS) 32, which is primarily a database that contains user-related and subscriber-related information. It also provides support functions in mobility management, call and session setup, user authentication, and access authorization.

It should be noted that the radio access network may communicate with the EPC 14 via one or a combination of gateway nodes, including the PGW, SWG, and a HRPD serving gateway (HSGW).

Figure 2:
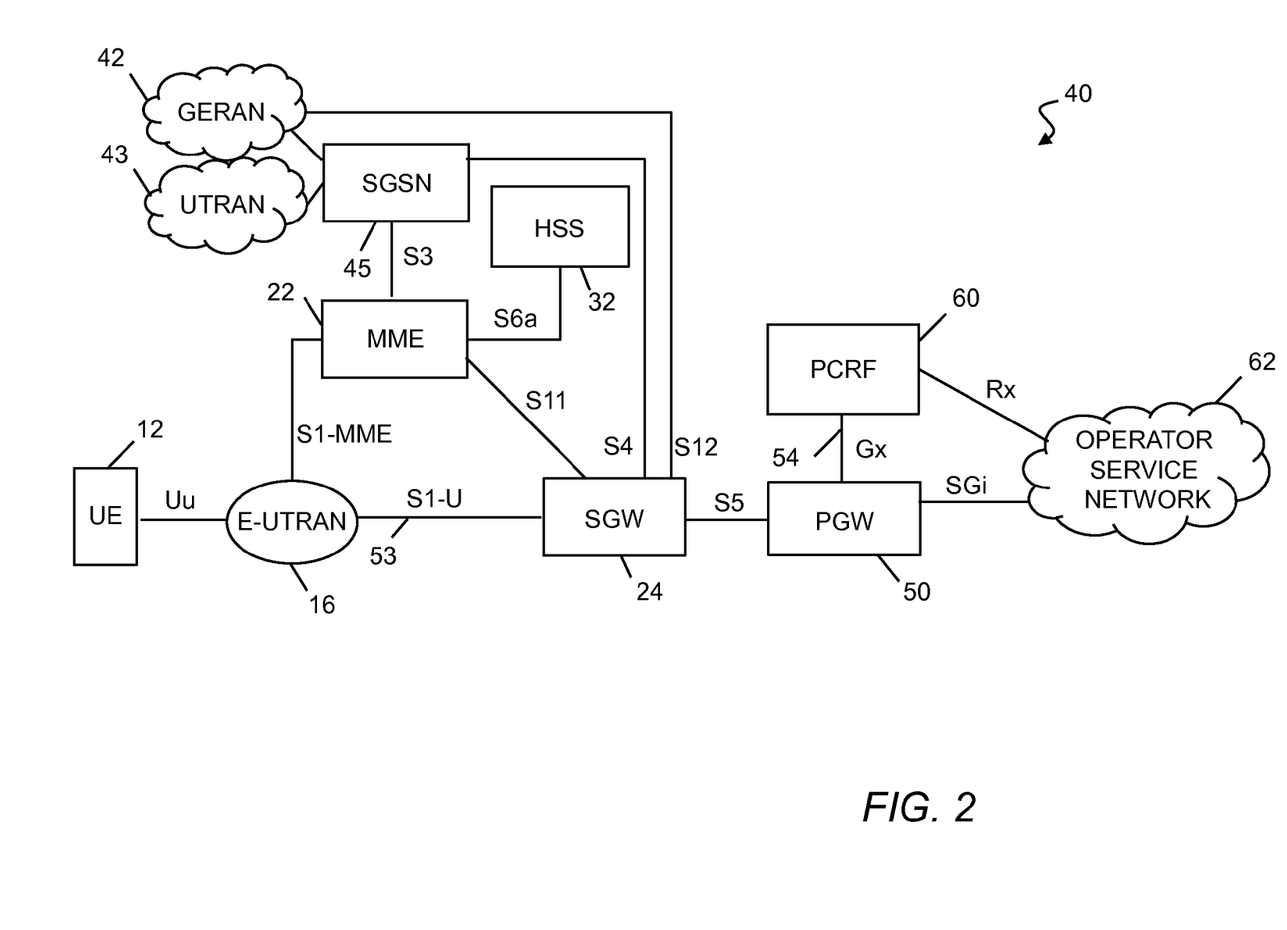
FIG. 2 is a simplified block diagram of an exemplary 3GPP network architecture with multiple radio access technologies according to the present disclosure.

FIG. 2 is a simplified block diagram of a 3GPP network architecture 40 for an exemplary telecommunication network implementing intuitive packet buffering and adaptive paging according to the present disclosure. The UE 12 is coupled via an LTE-Uu interface with the E-UTRAN 16, which is a radio access network interface for the UE 12. Although the UE 12 can reach the EPC using E-UTRAN 16, other access technologies are also specified by 3GPP. Existing 3GPP radio access networks are supported. 3GPP specifications define how the interworking is achieved between an E-UTRAN (LTE and LTE-Advanced), GERAN (radio access network of GSM/GPRS) 42, and UTRAN (radio access network of UMTS-based technologies WCDMA and HSPA) 43. The E-UTRAN 16 is connected to the MME 22 via an S1-MME interface, and also to the SGW 24 via an S1-U interface.

The SGW 24 is coupled to the PGW 50 via an S5/S8 interface, which is further coupled to one or more operator's external IP networks 62 over an SGi interface. The MME is coupled to the SGW 24 via an S11 interface, to the HSS 32 via an S6a interface, and to the Serving GPRS Support Node (SGSN) 45 via an S3 interface. GERAN 42 and UTRAN 43 are connected to core network nodes that provide GSM, EDGE, and UMTS services, such as the Serving Global Packet Radio Service (GPRS) support node 45.

The HSS 32, SGW 24, PGW 50, and Policy, Charging and Rules Function (PCRF) 60 are shared by the UMTS, GSM, EDGE, and LTE networks to provide services that include connectivity to operator packet networks through the PGW 50 and administrative/accounting services via the PCRF 60. A UE may use more than one radio access technology (RAT) at a time, or may switch between multiple RATs in order to receive uninterrupted services.

In a network triggered service request scenario, a downlink data packet intended for a particular UE is received at the PGW 26, which transmits the downlink data to the SGW 24. The SGW 24 in response sends a Downlink Data Notification (DDN) message to the MME 22 and SGSN 45 that have control plane connectivity with the UE. The MME 22 and SGSN 45 respond to the SGW with a DDN Ack message. If the UE is registered in the MME 22, the MME sends a paging message to each eNodeB belong to the tracking area(s) in which the UE is registered. The eNodeB receives the paging message from the MME 22, and in turns sends a paging message to the UE. The UE receiving the paging message initiates the UE triggered Service Request procedure to set up the bearer channel to prepare for data transmission.

The present disclosure specifically addresses situations in which small amounts of low priority downlink data is received at a high frequency at the SGW 24 destined for a delay-tolerant UE. Small but frequent data transmissions, though seemingly innocuous, can be a terrible drain on the UE and network resources. These frequent small data transmissions can cause the UE to transition from the idle state to the active state excessively, leading to premature depletion of battery charge in the UE. The sheer number of these data transmissions can also lead to congestion and network imbalance in the core network. While core network elements dedicate resources for passing on frequent small data transmissions to target UEs, the handling of the entire process within the core network can lead to inefficiencies on the priority aspects of call processing. Further, disproportionate amounts of scare radio resources in the paging and signaling channels become preoccupied with these data transmissions. The methodology described herein alleviates these problems and provides means to facilitate better efficiencies in radio resource utilization and core network processing. The proposed solution introduces a flexible mechanism to avoid paging a delay-tolerant UE prematurely by buffering its high frequency, low priority data for a time duration set according to the UE's current and historic activity data, thereby reducing radio resource and network usage, and improve UE battery life.

Figure 3:
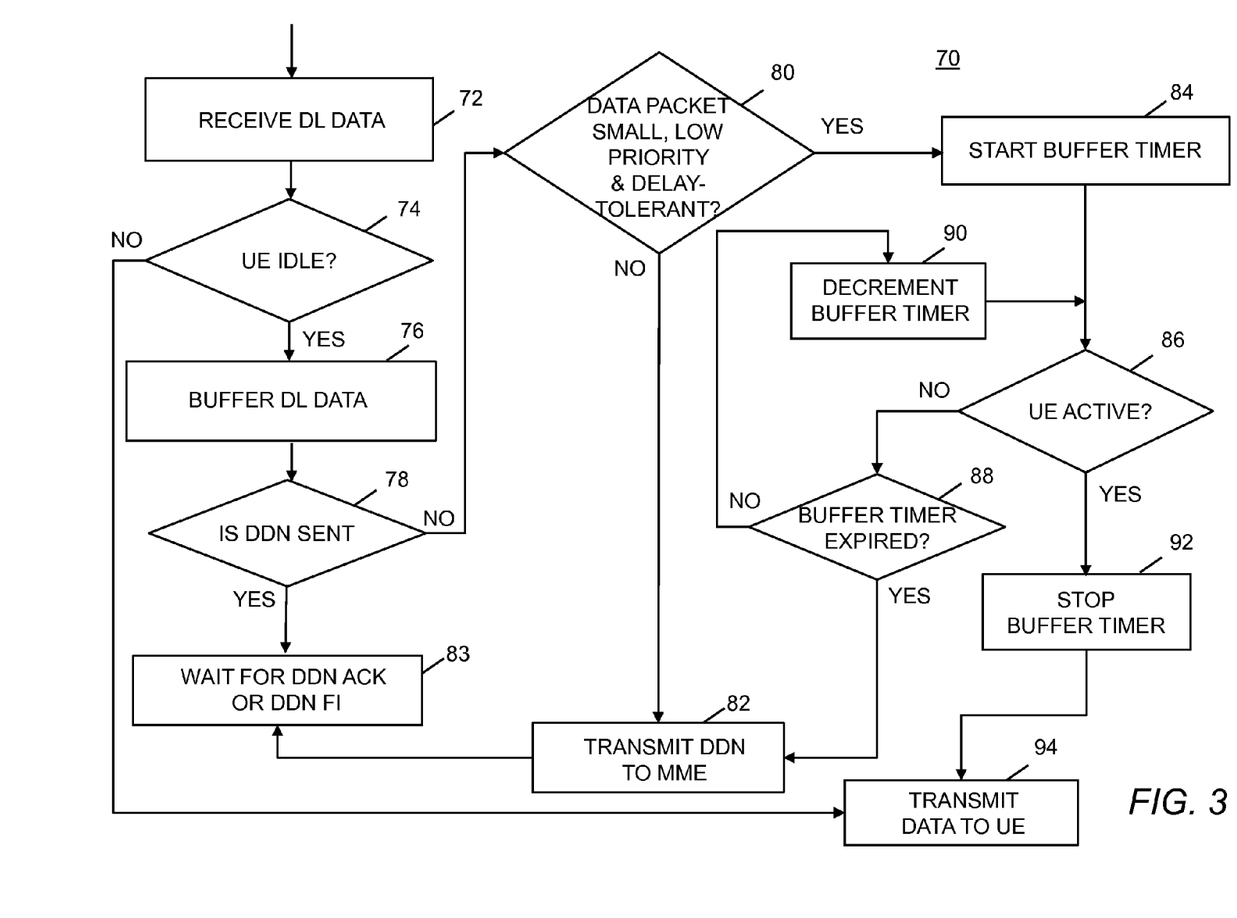
FIG. 3 is a simplified flowchart of an exemplary embodiment of intuitive data packet buffering and adaptive paging according to the present disclosure.

FIG. 3 is a simplified flowchart of an exemplary embodiment of a method of intuitive data packet buffering and adaptive paging 70 according to the present disclosure preferably implemented in the SGW 24 or a network node of similar functionality. The SGW 24 comprises an intuitive data packet buffering and adaptive paging module configured for carrying out the method shown in FIG. 3 and described below. In a network triggered service request situation, the SGW 24 receives downlink (DL) data from the PGW 50, as shown in block 72. A determination is made as to whether the UE for which the data is intended is currently in the idle state, as shown in block 74. If the UE is idle, the received data is buffered, as shown in block 76. The SGW 24 proceeds to check if a Downlink Data Notification (DDN) message is already outstanding for the UE which will suffice for the received data packet, or a DDN is required, as shown in block 78. When a DDN is required, a determination is made, shown in block 80, as to whether three conditions are met: 1) is the received downlink data packet small? 2) is the downlink data low priority? and 3) is the UE delay-tolerant?

Many Machine Type Communication (MTC) applications send or receive small amounts of data. This characteristic of MTC applications may lead to inefficient use of resources in the network. The received data packet size may be compared with a threshold parameter set by the local network operator to arrive at a decision for the first condition.

The low priority condition may be determined by a number of factors. The SGW 24 may determine whether the bearer channel is for low priority traffic based on the bearer's Allocation and Retention Priority (ARP) level or QoS Class Identifier (QCI). The determination may also be based on local operator policy, which may be based on the ARP, the identification (e.g., IMSI, IMEI SV, or MSISDN) of the UE, the active Access Point Name (APN), and/or a combination thereof. The local operator may create data priority profiles for the UEs using these parameters. The SGW 24 may also determine the priority based on Adaptive Learning techniques—observation-based knowledge of past data transmissions and active/idle transitions for this UE. The Adaptive Learning techniques may be fine-tuned to make deductions based on known data for the hour, day, weekday, weekend, and so forth and may fall back to QCI/ARP/local policy-based decisions, if enough data is not available to make a qualified decision.

Delay-tolerance may be a parameter specified by local operator policy. For example, the local operator may identify certain UEs as delay-tolerant. It may define a certain ARP range or QCI range as being delay-tolerant. This condition may also be determined by the APN, Guaranteed Bit Rate (GBR), Maximum Bit Rate (MBR), Aggregate Maximum Bit Rate (AMBR), and a combination thereof associated with the bearer channel.

If in block 80 it is determined that the three conditions are not met, then the SGW 24 proceeds to send a DDN message to the MME 22, shown in block 82, so that the MME will page the UE for transmission of the data. The SGW waits for the DDN Ack or DDN FI (Failure Indication) from the MME in block 83. However, if the three conditions are met, then the SGW 24 starts a buffer timer, as shown in block 84. The buffer timer may be set according to bearer priority based on ARP of the bearer channel, local operator policy, the anticipated UE activity determined by the MME, and/or a combination of these factors. The MME 22 monitors and records the UE's current activity and past activity history. For every UE, along with the last known Tracking Area Identity (TAI) and eNodeB information, the MME 22 tracks: 1) the time of the UE's last activity; 2) the average number of UE pings during a time interval; and 3) the maximum duration between the UE pings during a time interval.

For example, the MME 22 may record, for the current day, activity during each hour of the day (or a time interval defined by the local operator), last known activity time, average number of pings, and the maximum duration between pings. The MME 22 may also record similar historic activity information for the UE. Other factors such as time of the day, day of the week, weekday versus weekend, month, season, and time of the year that may influence the UE's activity are also noted and considered. For example, if from past historic data the UE is significantly more active during the daytime hours, then determination of the anticipated UE activity timing takes this factor into account. As a further example, if from historic data there is longer time span between pings or activity for the UE during the weekend, that factor is also taken into account. The MME 22 determines an anticipated duration between pings for the UE and makes this data available to the SGW24. The MME 22 may transmit this data in an Information Element (IE) as a part of a message, such as DDN Ack or Release Access Bearer Request. Sending this information in the Release Access Bearer Request allows the SGW to delay sending a DDN in the event of a data packet arriving close to the next UE activity time, for a delay-tolerant UE. With this proactive information exchange and application between the MME and SGW, reduction in network signaling and improved resource utilization may be achieved.

Accordingly, on the SGW, the buffer timer may be set in response to the anticipated duration for UE activity. For example, if it has been three minutes since the last UE activity, and the typical duration between pings for the UE based on current and historic data is six minutes, then the buffer timer is set for three minutes. However, if it has been seven minutes since the last UE activity, and the typical duration between pings is six minutes, then the buffer timer should be set to zero.

In block 86, a determination is made as to whether the UE has become active. If not, a determination is made in block 88 as to whether the buffer timer has expired. If the buffer timer has not expired, then the process proceeds to block 90 to decrement the buffer timer and continue count down, and execution returns to block 86, in which a determination is made as to whether the UE is still idle. If the UE is still in the idle state, the buffer timer is checked again in block 88. However, if the UE is not idle, then the buffered data should be transmitted to the UE to take advantage of the active bearer plane. Therefore, the buffer timer is stopped in block 92 and the SGW 24 proceeds to transmit data to the UE in block 94.

In response to the DDN sent by the SGW 24, the MME 22 replies with a DDN Acknowledgement (Ack) message. The MME 22 essentially sends a paging message to each eNodeB belong to the tracking areas in which the UE is registered. The eNodeB in turn pages the UE. The UE initiates the UE triggered service request procedure to establish the bearer channel. Upon receiving the DDN Ack message from the MME 22, the SGW 24 transmits the buffered data to the UE on the established bearer channel, as shown in block 80.

For the sake of brevity and clarity, some scenarios not explicitly detailed in FIG. 3 are contemplated herein. For example, if the SGW 24 receives additional low priority data after the first data packet is buffered, the additional low priority data are also buffered but without restarting the buffer timer. Further, if after the initial low priority downlink data are buffered, high priority data, or downlink data that do not satisfy the three conditions in block 78 are received, then the SGW 24 proceeds to immediately transmit the DDN to the MME 22, so that the high priority data as well as the buffered low priority data are transmitted to the UE without delay. Additionally, if an UE-initiated activity occurs before the buffer interval expires, the SGW 24 cancels the buffer timer and transmits the buffered data to the UE upon completion of the UE-initiated service request procedure.

Figure 4:
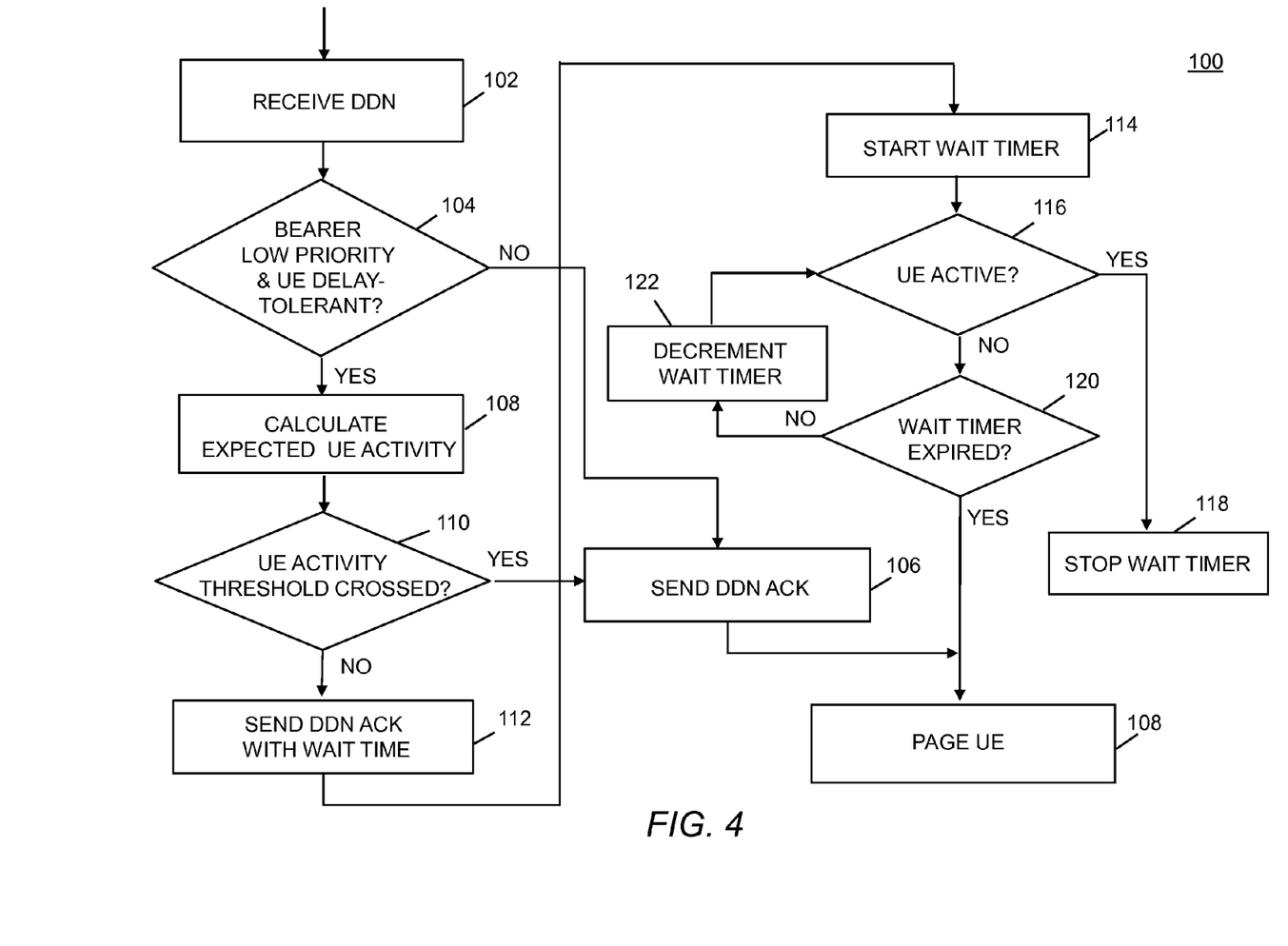
FIG. 4 is a simplified flowchart of another exemplary embodiment of intuitive data packet buffering and adaptive paging according to the present disclosure.

FIG. 4 is a simplified flowchart of another exemplary embodiment of a method of intuitive data packet buffering and adaptive paging 100 according to the present disclosure preferably implemented in the MME 22 or a network node of similar functionality, such as the S4-SGSN. The MME 22 comprises an intuitive data packet buffering and adaptive paging module configured for carrying out the method shown in FIG. 4 and described below. In block 102, the MME 22 receives a DDN message from the SGW 24. In block 104, the MME 22 also makes a determination of whether the following conditions are met: 1) is the DDN trigger for a low priority bearer/UE? and 2) is the UE delay-tolerant? A more detailed description of these conditions are set forth above.

If the DDN is not for a low priority bearer/UE, or the UE is not delay-tolerant, then the MME 22 sends a DDN Ack, as shown in block 106, and proceeds to page the UE, as shown in block 108, so that the user plane may be brought up as soon as possible for the data to be transmitted to the UE. However, if the conditions in block 104 are met, the MME determines the UE expected activity time based on the historical data, as shown in block 108. This expected UE activity time is used as the wait timer value on the MME. If the expected UE activity time has crossed a threshold already, as determined in block 110, then the MME 20 proceeds with the DDN Ack to the SGW and paging of the UE, as shown in blocks 106 and 108. If the threshold is not reached, the wait time value is sent to the SGW within the DDN Ack, message as shown in block 112, so the SGW is aware of how long the packets need to be buffered. Then a wait timer is started, as shown in block 114. The wait timer may be set according to local operator policy and/or based on the anticipated UE activity time determined by the MME. The MME 22 monitors and records the UE's activity history. For every UE, along with the last known Tracking Area Identity (TAI) and eNodeB information, the MME 22 tracks: 1) time of the UE's last activity; 2) the average number of UE pings during a time interval; and 3) the maximum duration between the UE pings during a time interval.

For example, the MME 22 may record, for the current day, activity during each hour of the day (or a time interval defined by the local operator), last known activity time, average number of pings, and the maximum duration between pings. The MME 22 may also record historic activity information for the UE. Other factors such as time of the day, day of the week, weekday versus weekend, and time of the year that may influence the UE's activity are also noted and considered. The MME 22 determines an anticipated duration between pings for the UE and sets the wait timer in accordance to this value. Therefore, the wait timer may be set according to the anticipated duration for UE activity. For example, if it has been three minutes since the last UE activity, and the typical or anticipated duration between pings for the UE based on current and historic data is six minutes, then the wait timer is set for three minutes. However, if it has been seven minutes since the last UE activity, and the typical duration between pings has been determined to be six minutes for the given time period, then the wait timer should be set to zero.

After the wait timer is set in block 114, a determination is made as to whether the UE is active in block 116. If the UE is now in the active state, the process terminates the wait timer in block 118, as the user plane is now up and the data buffered at the SGW can be transmitted to the UE on the bearer channel. However, if the UE is not active, the process proceeds to blocks 120 and 122 to continue the wait. Therefore, the downlink data is transmitted to the UE upon the expiration of the wait timer or when the UE becomes active.

According to the above-described methodology, frequent small data transmissions to delay-tolerant UEs are buffered for delayed transmission, but not discarded. The downlink data is buffered and the UE is not paged until the UE is anticipated to become active, or when other higher priority data is received requiring an immediate page for the UE. The methodology contemplates adapting the data buffer time based on local operator configuration, ARP, APN, or other indications of priority, and/or anticipated activity of the UE. As the UE's activity level may change over time, this method observes and adapts to these changes so that the buffer time is set close to coincide with the time of the UE's next anticipated activity. In this manner, network resources and UE resources are economized and conserved.

Figure 5:
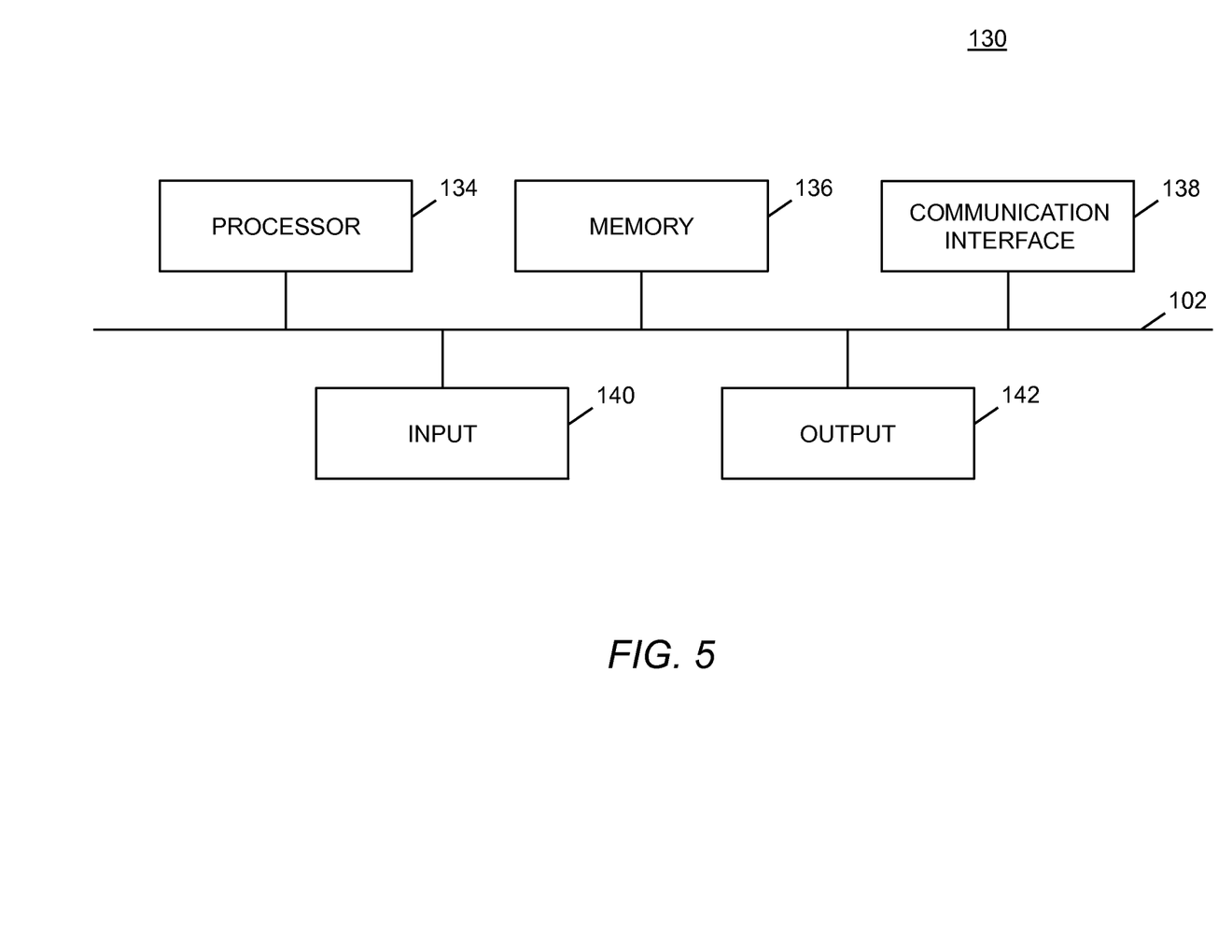
FIG. 5 is a simplified block diagram of an exemplary network node for carrying out methods of intuitive data packet buffering and adaptive paging according to the present disclosure.

FIG. 5 is a simplified block diagram of an exemplary network node 130 for carrying out the methods of intuitive data packet buffering and adaptive paging according to the present disclosure. The network node 130 may include a bus 132 interconnecting a processor 134, a memory 136, a communication interface 138, an input device 140, and an output device 142. The bus 132 enables communication among the components of network node 130. The processor 134 may include one or more processing units or microprocessors that interpret and execute coded instructions. In other implementations, the processor 134 may be implemented by or include one or more application-specific integrated circuits (ASICs), field programmable gate arrays (FPGAs), or the like.

The memory 136 may include a random access memory (RAM) or another type of dynamic storage device that stores information and instructions for execution by the processor 134. The memory 136 may also include a read-only memory (ROM) or another type of static storage device that stores static information and instructions for the processor 134. The memory 136 may further include other types of magnetic or optical recording medium and its corresponding drive for storing information and/or instructions. As used herein, the term "memory" is broadly to include registers, buffers, and other data constructs configured to hold data.

The communication interface 138 may include protocol stacks for processing data transmitted via a data protocol now know or to be developed. The communication interface 138 may include transceiver-like devices and antenna that enables the network node 130 to communicate via radio frequency with other devices and/or systems. The communication interface 138 may further include interfaces, ports, or connectors to other devices.

The input 140 may include one or more devices that permit an operator to enter information to the network node 130, such as a keyboard, a keypad, a mouse, a pen, a touch-sensitive pad or screen, a microphone, one or more biometric mechanisms, and the like. The output 142 may include one or more devices that outputs information to the operator, such as a display, a printer port, a speaker, etc.

As described herein, the network node 130 may perform certain operations in response to the processor 94 executing software instructions contained in a computer-readable medium, such as memory 136. A computer-readable medium may be defined as a physical or logical memory device. A logical memory device may include memory space within a single physical memory device or spread across multiple physical memory devices. The software instructions may be read into memory 136 from another computer-readable medium or from another device via a communication interface 138. The software instructions contained in the memory 136 may cause processor 134 to perform processes described herein. Alternatively, hardwired circuitry may be used in place of or in combination with software instructions to implement processes described herein. Thus, implementations described herein are not limited to any specific combination of hardware circuitry and software.

In this disclosure, the term "module" and "node" may be used to refer a physical circuit or collection of hardware components, a logical code module, functionality, and/or a combination of hardware and software entities. Although it is contemplated that the methods described herein reside in the SGW and MME, however, other suitable network node(s) may carry out these methods. Further, in some implementations, SGW and MME functionalities may be combined or co-located and reside in the same physical box.

The features of the present invention which are believed to be novel are set forth below with particularity in the appended claims. However, modifications, variations, and changes to the exemplary embodiments described above will be apparent to those skilled in the art, and the system and method described herein thus encompasses such modifications, variations, and changes and are not limited to the specific embodiments described herein.

GLOSSARY

APN Access Point Name
ARP Allocation and Retention Priority
AMBR Aggregate Maximum Bit Rate
CDMA Code Division Multiple Access
CS Circuit Switched
DDN Downlink Data Notification
DDN Ack Downlink Data Notification Acknowledgement
DDN FI Downlink Data Notification Failure Indication
DL Downlink
eNodeB evolved Node B
EPC Evolved Packet Core
EPS Evolved Packet Subsystem
E-UTRAN Evolved UMTS Terrestrial Radio Access Network
FDMA Frequency Division Multiple Access GBR Guaranteed Bit Rate
GPRS General Packet Radio Service
GSM Global System for Mobile Communications
GTP GPRS Tunneling Protocol
HSS Home Subscriber Server
ICS IMS Centralized Services
IMS IP-Multimedia Subsystem
IP Internet Protocol
ITU International Telecommunications Union
LTE Long Term Evolution
MBR Maximum Bit Rate
MME Mobility Management Entity
MTC Machine Type Communications
OFDMA Orthogonal FDMA
PDN GW Packet Data Network Gateway
PGW Packet Data Network Gateway
PS Packet Switched
PSS PS Streaming Service
QCI QoS Class Identifier
QoS Quality of Service
RAT Radio Access Technology
SGW Serving Gateway
TAI Tracking Area Identity
TDMA Time Division Multiple Access
UE User Equipment
UMTS Universal Mobile Telecommunication System
UTRA Universal Terrestrial Radio Access
UTRAN Universal Terrestrial Radio Access Network
W-CDA Wideband-CDM
W-CDMA Wideband Code Division Multiple Access

What is claimed is:

1. A method comprising:
receiving a downlink data packet intended for a UE;
buffering the received downlink data packet in response to the UE currently being in an idle state;
starting a timer in response to a determination that the received downlink data packet is small and low priority and the UE is delay-tolerant, the timer being set based on an anticipated duration between UE activity, wherein the anticipated duration between UE activity is determined based on monitored UE current activity and monitored UE past activity history; and
transmitting the downlink data packet to the UE upon the expiration of the timer.

2. The method of claim 1, wherein the starting of the timer comprises setting the timer in response to a priority setting of a bearer channel set up to transmit data to the UE and the anticipated duration between UE activity.

3. The method of claim 1, wherein the starting of the timer comprises setting the timer in response to a local operator policy setting and the anticipated duration between UE activity.

4. The method of claim 1, wherein the anticipated duration between UE activity is determined in the MME, the method further comprising;
sending the anticipated duration between UE activity to the SGW in a Release Access Bearer Request message.

5. The method of claim 1, wherein the monitored UE current activity comprises monitoring and recording UE's last activity time, average number of UE pings during a time interval, and maximum duration between UE pings in the time interval.

6. The method of claim 1, wherein the monitored UE past activity history comprises monitoring and recording a historic average number of UE pings during a time interval, and a historic maximum duration between UE pings in the time interval.

7. The method of claim 1, wherein the determination of the anticipated duration between UE activity comprises determining the anticipated duration in response to at least one of time of the day, day of the week, weekday versus weekend, month, season, and time of the year.

8. The method of claim 1, further comprising transmitting the buffered downlink data packet to the UE in response to receiving a high priority data packet intended for the same UE even if the timer has not yet expired.

9. The method of claim 1, further comprising receiving and buffering an additional small, low priority downlink data packet intended for the same UE.

10. The method of claim 1, further comprising determining whether the received downlink data packet is small, low priority, and the UE is delay-tolerant based on local operator policy.

11. The method of claim 1, further comprising determining whether the received downlink data packet is small and low priority, and the UE is delay-tolerant based on at least one of Allocation and Retention Priority, QoS Class Identifier, Access Point Name, Quality of Service, Guaranteed Bit Rate, Maximum Bit Rate, Aggregate Maximum Bit Rate, and UE identity.

12. A method of managing frequent low priority downlink data transmissions, comprising:
receiving a downlink data packet intended for a UE;
buffering the received downlink data packet in response to a determination that the received downlink data packet is low priority, and the UE is delay-tolerant;
starting a timer, the timer being set in response to the UE currently being in an idle state, the timer being set according to an anticipated duration between UE activity, wherein the anticipated duration between UE activity is determined based on monitored UE current activity and monitored UE past activity history; and
transmitting the downlink data packet to the UE upon the expiration of the timer.

13. The method of claim 12, wherein the starting of the timer comprises setting the timer in response to a priority setting of a bearer channel set up to transmit data to the UE and the anticipated duration between UE activity.

14. The method of claim 12, wherein the starting of the timer comprises setting the timer in response to a local operator policy setting and the next anticipated duration between UE activity.

15. The method of claim 12,
wherein the anticipated duration between UE activity is determined in the MME, the method further comprising:
sending the anticipated UE activity time to the SGW.

16. The method of claim 12, wherein the monitored UE current activity comprises monitoring and recording UE's last activity time, average number of UE pings during a time interval, and maximum duration between UE pings in the time interval.

17. The method of claim 12, wherein the monitored UE past activity history comprises monitoring and recording a historic average number of UE pings during a time interval, and a historic maximum duration between UE pings in the time interval.

18. The method of claim 12, wherein the determination of the anticipated duration between UE activity comprises determining the anticipated duration in response to at least one of time of the day, day of the week, weekday versus weekend, month, season, and time of the year.

19. The method of claim 12, further comprising transmitting the buffered downlink data packet to the UE in response to receiving a high priority data packet intended for the same UE even if the timer has not yet expired.

20. The method of claim 12, further comprising receiving and buffering an additional low priority downlink data packet intended for the same UE.

21. The method of claim 12, further comprising determining whether the received downlink data packet is low priority, and the UE is delay-tolerant based on local operator policy.

22. The method of claim 12, further comprising determining whether the received downlink data packet is low priority, and the UE is delay-tolerant based on at least one of Allocation and Retention Priority, QoS Class Identifier, Quality of Service, Access Point Name, Guaranteed Bit Rate, Maximum Bit Rate, Aggregate Maximum Bit Rate, and UE identity.

23. A system for managing frequent low priority downlink data transmissions, comprising:
- a first interface configured to receive a downlink data packet intended for a UE;
- a memory configured to buffer the received downlink data packet in response to a determination that the received downlink data packet is low priority, and the UE is delay-tolerant;
- a second interface configured to receive an anticipated duration between UE activity, wherein the anticipated duration between UE activity is determined based on monitored UE current activity and monitored UE past activity history;
- a timer being configured based on the anticipated duration between UE activity; and
- a third interface configured to transmit the downlink data packet to the UE upon the expiration of the timer.

24. The system of claim 23, wherein the timer is configured in response to a priority setting of a bearer channel set up to transmit data to the UE and the anticipated duration between UE activity.

25. The system of claim 23, wherein the timer is configured in response to a local operator policy setting and the anticipated duration between UE activity.

26. The system of claim 23, wherein the timer is configured in response to the UE's last activity time, average number of UE pings during a time interval, and maximum duration between UE pings in the time interval.

27. The system of claim 23, wherein the timer is configured in response to a historic average number of UE pings during a time interval, and a historic maximum duration between UE pings in the time interval.

28. The system of claim 23, wherein the timer is configured in response to the anticipated duration between UE activity that takes into account at least one of time of the day, day of the week, weekday versus weekend, month, season, and time of the year.

29. The system of claim 23, wherein the third interface is configured to transmit the buffered downlink data packet to the UE in response to receiving a high priority data packet intended for the same UE even if the timer has not yet expired.

30. The system of claim 23, wherein the memory is configured to buffer an additional low priority downlink data packet intended for the same UE.

31. The system of claim 23, further comprising a processor configured to determine whether the received downlink data packet is low priority, and the UE is delay-tolerant based on local operator policy.

32. The system of claim 23, further comprising a processor configured to determine whether the received downlink data packet is low priority, and the UE is delay-tolerant based on at least one of Allocation and Retention Priority, QoS Class Identifier, Quality of Service, Access Point Name, Guaranteed Bit Rate, Maximum Bit Rate, Aggregate Maximum Bit Rate, and UE identity.

33. The system of claim 23, wherein the second interface is configured to receive the anticipated duration between UE activity in a Release Access Bearer Request message.

* * * * *